F. C. ERDMANN.
GREASING DEVICE.
APPLICATION FILED AUG. 14, 1918.

1,300,145.

Patented Apr. 8, 1919.

Inventor
F. C. Erdmann
By Victor J. Evans
Attorney

UNITED STATES PATENT OFFICE.

FREDERICK C. ERDMANN, OF NORTH FOND DU LAC, WISCONSIN.

GREASING DEVICE.

1,300,145.   Specification of Letters Patent.   Patented Apr. 8, 1919.

Application filed August 14, 1918. Serial No. 249,907.

*To all whom it may concern:*

Be it known that I, FREDERICK C. ERDMANN, a citizen of the United States, residing at North Fond du Lac, in the county of Fond du Lac and State of Wisconsin, have invented new and useful Improvements in Greasing Devices, of which the following is a specification.

This invention relates to lubricating devices, and has for its object the provision of a device adapted for permanent association with the hub of a wagon wheel whereby grease may be properly applied to the spindle when desired without the necessity of removing the wheel as is the present general practice.

An important object is the provision of a device of this character comprising a grease cup permanently associated with the hub of a wheel and including a stem which enters through the periphery of the hub and communicates with the interior of the skein and which further includes the provision of a bracing plate so formed as to reach between successive spokes of the wheel for holding the device firmly in position.

Another object is the provision of a device of this character including the provision of a bracing plate engageable between successive spokes whether the spokes be arranged in alinement or whether they be arranged in staggered relation as is frequently the case.

An additional object is the provision of a device of this character which will be very simple and inexpensive in manufacture, easily installed, highly efficient in use, durable in service and a general improvement of the art.

With the above and other objects and advantages in view, the invention consists in the details of construction to be hereinafter more fully described and claimed, and illustrated in the accompanying drawings in which:—

Figures 1, 2:
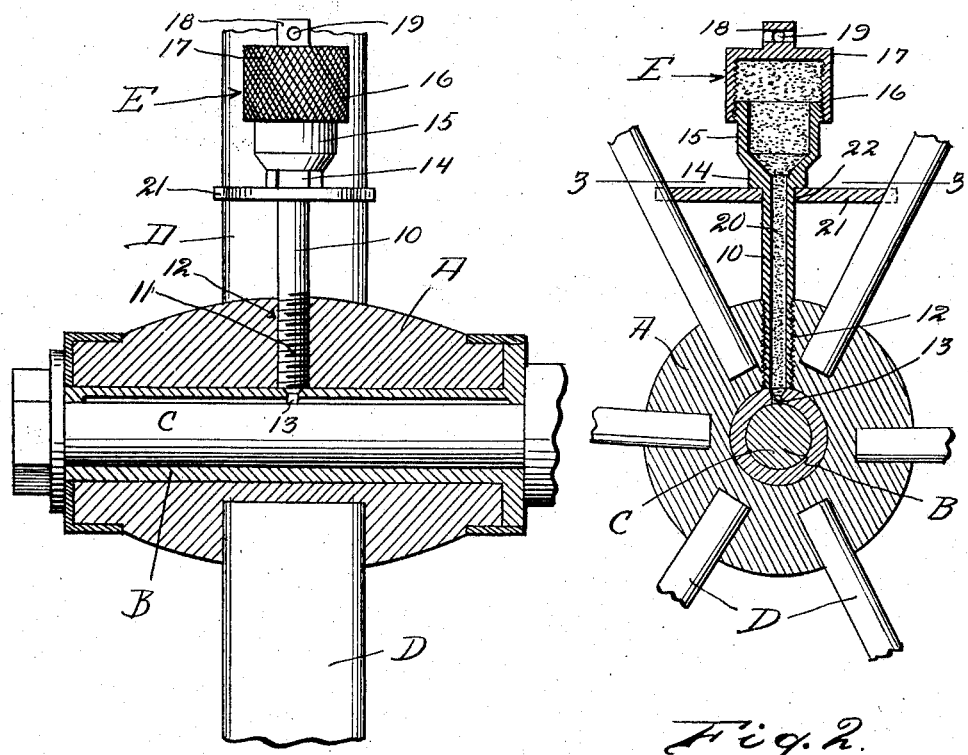
Figures 3, 4:
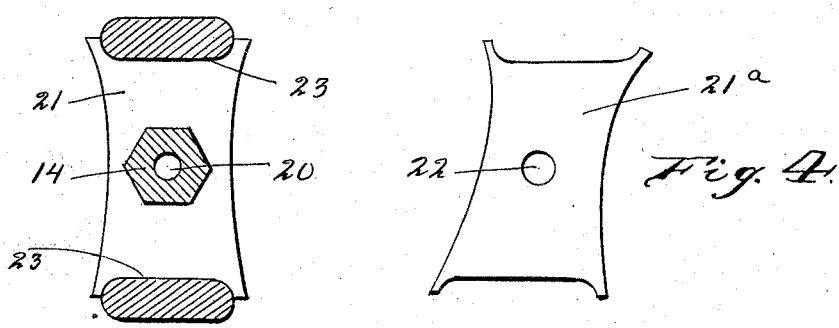

Figure 1 is a longitudinal sectional view through a wagon hub showing my device applied thereto and in elevation Fig. 2 is a cross sectional view through the hub and through the device Fig. 3 is a cross sectional view on the line 3—3 of Fig. 2 and Fig. 4 is a view similar to Fig. 3 showing a modified form of bracing plate.

Referring more particularly to the drawing the letter A designates the hub of a wagon wheel provided with the usual skein B rotatable about the spindle C. The spokes are designated by the letter D.

In carrying out my invention, designated broadly by the letter E, I provide a lubricating device comprising a relatively long shank 10 which is threaded toward one end, as shown at 11, for engagement within a hole 12 formed through the hub A between two successive spokes. The hole 12 terminates at the periphery of the skein B and communicates with a smaller hole 13 extending through the skein and to the spindle. Adjacent its other end, the shank 10 has formed thereon an angular portion 14, which may be hexagonal as shown or of any other suitable configuration. Above the angular portion 14 is formed an enlarged portion 15 which constitutes a cup and which is externally threaded as shown for engagement by the internally threaded flange 16 of a cover 17 which is provided at its outer end with an angular portion 18 provided with diametrically oppositely extending holes 19 for a purpose which will be hereinafter made apparent. The shank 10 is provided with a bore 20 which communicates with the interior of the cup 15 and with the hole 13 in the skein.

In order that the device may be properly placed when associated with the hub, I provide a plate 21 which is provided with a central opening 22 for engagement upon the shank 10. At opposite sides the plate 21 is cut away as shown at 23 to provide curved edges engaging against the opposed faces of successive spokes.

After the holes 12 and 13 are provided in the hub body A and skein B respectively, my device is applied to the hub by first engaging upon the shank 10 the plate 21 and then screwing the threaded end 11 of the shank into the hole 12. The size and shape of the plate 21 is such that when the shank is screwed into the hole 12 as far as it will go the angular portion 14 of the shank will engage upon the top of the plate 21 and hold the plate 21 firmly in engagement with successive spokes. The cup 15 is then filled with grease and the cover 16 threaded into position upon the cup.

In the use of the device when it is desired to lubricate the wheel, it is merely necessary that the wagon be moved until the wheel is in such a position that my device is disposed at the top thereof, preferably though not necessarily, whereupon turning the cover 16 will compress the grease within the cup 15 and force the grease through the bore 20 and hole 13 onto the spindle C as will be readily understood. In case it should be difficult to turn the cover 16 with the fingers, the operator may apply a wrench to the angular portion 18 or insert a small rod through the holes 19 for accomplishing the turning action. In order to prevent accidental rotation of the cover 16 it is merely necessary that a wire 24 or other suitable flexible member be passed through certain of the holes 19 and engaged about the adjacent spoke.

In some types of wagon wheels the spokes are not all arranged in alinement but are arranged in staggered relation. In applying my device to this type of wheel it is merely necessary to substitute the form of bracing plate shown in Fig. 4 for the one shown in Fig. 3.

From the foregoing description and a study of the drawing it will be apparent that I have thus provided a lubricating device which may be permanently attached to the hub of a wagon wheel, which will be very simple and efficient in its action, durable in use and which will efficiently perform all the functions for which it is intended.

While I have shown and described the preferred embodiment of my invention, it will of course be readily understood that I reserve the right to make such changes in the form, construction and arrangement of parts as will not depart from the spirit of the invention nor the scope of the subjoined claims.

Having described my invention I claim:—

1. In combination with a wagon wheel, a lubricating device comprising a shank threaded into the hub of the wheel and having its outer end formed as a cup and exteriorly threaded, a cover threaded upon said cup, said shank being provided with a bore communicating with a hole through the skein of the hub, a bracing plate spaced from the periphery of the hub and having its opposite sides curved for engagement with the opposing faces of successive spokes, said plate being provided with a hole for the passage of said shank, and an enlarged portion on said shank bearing on said plate and holding the ends of said plate in engagement with the spokes.

2. A lubricating attachment for wagon wheels comprising a shank threaded into the wheel hub and provided with a bore communicating with the interior thereof, a cup formed on the outer end of said shank, a cover threaded upon said cup, said shank being disposed centrally between two successive spokes, in combination with supporting means comprising a plate disposed upon said shank and having its opposite edges curved to conformingly engage the opposite faces of the successive spokes, and an enlarged portion on said shank bearing upon said plate whereby the plate will be held in engagement with the spokes, the curved ends of said plate being in non-alinement for engagement with staggered spokes.

In testimony whereof I affix my signature.

FREDERICK C. ERDMANN.